Figure 1:
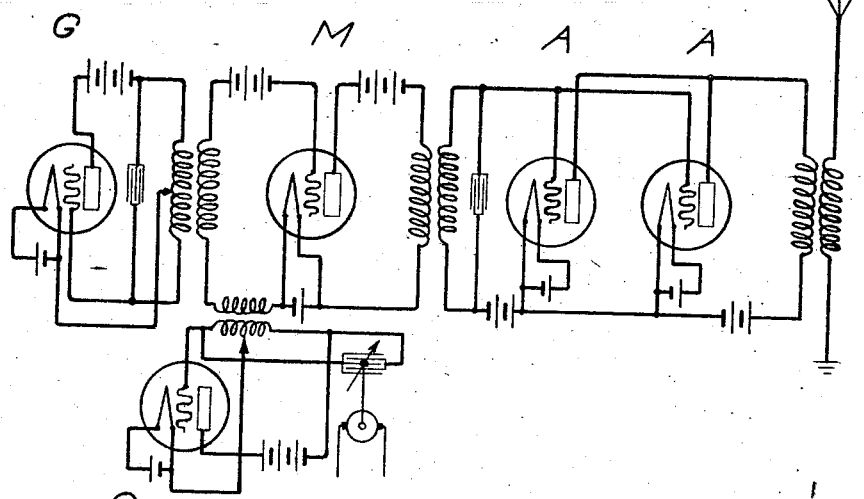

June 29, 1926.

L. M. CLEMENT 1,590,346

RADIO DIRECTION FINDING

Filed Sept. 25, 1920

Inventor:
Lewis M. Clement.
by C. A. Sprague Atty.

Patented June 29, 1926.

1,590,346

UNITED STATES PATENT OFFICE.

LEWIS M. CLEMENT, OF EAST ORANGE, NEW JERSEY, ASSIGNOR TO WESTERN ELECTRIC COMPANY, INCORPORATED, OF NEW YORK, N. Y., A CORPORATION OF NEW YORK.

RADIO DIRECTION FINDING.

Application filed September 25, 1920. Serial No. 412,807.

This invention relates to radio transmission of signals and in particular to a system of transmission adapted for direction finding.

The object of the invention is, in part, to provide an efficient means for indicating to the receiving station the bearing of the reference station by means of signal impulses.

A particular object is to make possible the accomplishment of the above mentioned object by means which involves the use of an undamped wave source of propagation.

Other objects of the invention will appear more fully hereinafter.

The invention comprises, in substance, the transmission of a modulated undamped wave in direction finding to simulate, in effect, the highly damped wave radiated from a spark source such as has been used in direction finding systems heretofore.

The system of this invention is applicable generally as a means for enabling a radio receiving station to obtain its bearings by means of observations based on the direction of received radio impulses transmitted from a reference station, the position of which is known. The invention is particularly applicable as an aid to navigation, both in air and on water, to enable a navigator to determine, for example, his geographical position. This he can accomplish by taking bearings on two reference stations, and calculating his position by triangulation, a method entirely analogous to that used in surveying.

It may be sufficient, in particular cases, to determine his bearings alone, with reference to a known transmitting station. For instance, the reference station could well be used to mark the location of the home station of a scout-plane flying over strange and hostile territory. In this case, the knowledge of the position of the plane would be only slightly more valuable than a knowledge of its direction. The situation would be somewhat different in the case of a ship, which would ordinarily require to know its position as well as its bearing in order to enable it to set the proper course for a port of call not necessarily on a line between the ship and the reference station, or to enable it to steer a devious course to avoid perils of navigation. It is obvious that a determination of the bearings with reference to a known point may at least enable the navigator to check the accuracy of his instruments, even though it does not inform him of his position.

Although the discussion of the possible use broadly of the system of direction finding has been illustrated by particular reference as to its use as a navigation aid, its use is by no means confined within such narrow limits. That it is so generally considered is, possibly, due to the impulse recently given to development in radio goniometry on account of war conditions, in which systems of the generic type above described were principally used for that purpose. It is capable of use at land stations to determine accurately the direction of the transmitting station. Many other uses will readily occur to one versed in the art, and further illustration will not be given.

A system embodying broadly the features of this invention requires a reference station continually sending out signal impulses and a receiving station to receive the impulses. The receiving station must include means for determining accurately the direction from which the received signals emanate. Means adaptable for use in this invention may be any one of the types, of which there are several, of directive receiving circuits. Receiving means of this general type have been developed for other uses and have been brought to a high state of perfection for prevention of interference. They are very commonly of the Bellini-Tosi type although they may consist of a single loop. The Bellini-Tosi type is characterized by the conjoint action of a fixed and a movable receiving conductor, one of this type being shown in Fig. 2. A report of tests on direction receiving coils especially adaptable for use on airplanes is contained in the United States Bureau of Standards Scientific Paper No. 353.

Having given a station continually sending out signals and a receiving circuit capable of determining the direction of incidence of received signals, there is required only a means to insure that the direction from which the incident waves proceed indicates accurately the direction of the sending station, and the means of the invention is designed to accomplish this purpose.

The phenomena of reflection and refraction of radio waves have been known for a considerable time and have been obstacles to the development of direction finding systems. The effect of these phenomena is that the direction of the resulting incident wave may vary considerably from the direction of the sending station. The incident wave would consist of the superposition of the directly received wave and a wave or waves which reach the receiver after pursuing a devious path which is not readily determined. Except for reflection and refraction effects these undesired waves would not be incident on the receiver, and accordingly would not contribute their effect to vary the apparent direction of the transmitting station by causing the resultant direction of incident waves to be different from the direction of the directly transmitted signal. It is an object of all systems of direction finding to avoid the reception of all waves except those which proceed directly from the transmitting station.

The phenomena credited broadly to reflection and refraction effects have been ascribed variously to reflection and refraction due to masses of ionized air, to the presence of clouds, and to differential absorption effects due to the conductive "pockets" in the earth which tend to produce a change of wave front in a manner somewhat analogous to the refraction of light at the boundaries of the transmitting media. When a wave travels in a direction closely parallel to a shore of salt water, a deflection of the path toward the land side has been noticed, and the erratic results obtained at near sun-down suggests a common cause which produces this effect and the sudden change at that time in the intensity of the received signal, which has been the subject of study from the beginning of radio development. Experiments by A. H. Taylor at the Bureau of Standards, reported in Scientific Paper No. 353, noted above, to determine the feasibility of the use of directive receiving airplanes for direction finding on long wave lengths showed that at about sun-down it was impossible to tell from which direction the received signals were transmitted. In general, a long wave length is associated with relatively great power and high power stations are almost universally equipped to transmit undamped waves, so in effect, his experiments were a test, as well, of undamped waves as compared with damped waves. He found it not at all unusual to note a sudden apparent change in the direction of the transmitting station amounting to many degrees. He concluded, among other things, that damped wave transmission from a spark source, was much more effective than undamped wave transmission for direction finding purposes and also that a short wave is better than a long wave. Whether by design or by pressure of circumstance, spark transmission has been universally used so far as known in direction finding systems and it is believed that damped wave transmission has been generally and for a long time recognized as the most effective for this purpose.

The advantage derived from the use of damped waves may be accounted for on the ground that definite and persistent interference phenomena are impossible from a damped wave of the type radiated from spark stations, it being evident that there can be no definite or systematic arrangement of interference at the receiver, since the latter end of one train might arrive at the same time as the beginning of an adjacent train. This may be accounted for, in part at least, by the presence of a progressive change in the wave form between successive alternations due to differential damping of harmonics the effect being that of a progressive change in frequency. In the case of a continuous wave there is a single frequency and the parts of a wave impinging on different reflecting and refracting media are reflected or refracted in accordance with a common law, and to an extent deducible from characteristics of the particular wave length being radiated. These conditions make for definite and persistent interference phenomena which may result in incidence on the receiving circuit of a wave similar, in all respects except direction, to the wave directly received from the source. By the use of spark signals, then, waves incident on the receiver from other directions than that of the transmitter make their presence felt, if at all, as a confusion of sound in the telephone receiver not difficult to distinguish from the desired signal and therefore not causing confusion in the direction of the transmitting station. In the discussion above, the term "interference phenomena" is intended to cover broadly both interfering and reinforcing effects. Although it is not necessary for the present purpose to discuss the effects of long wave length, as compared with short wave length, it may be pointed out that with shorter waves the path difference measured in wave lengths, between different paths of reflected or refracted waves will be greater than for long wave lengths. This means that the chances of mutual interference effects are increased in a somewhat similar proportion.

The present invention was conceived as a solution of the problem apparently sought by Taylor. In radio compass signaling systems, as developed by the Navy, the ship stations are ordinarily not provided with directive receiving means, the compass stations of the shore being so provided and having the duty of determining the position of the calling ship and informing her of her position. It may well happen that a ship which has a directive receiving device may desire to determine her position by bearings on two shore stations, in which case it would be convenient to receive from one or two of the high power transoceanic stations, which are so few in number and so differentiated from each other by known characteristics as to be readily distinguished and identified. Or, as another example, in the case of transoceanic airplane flight, it would be highly desirable to maintain continual contact with a shore station or stations throughout the voyage. This, again, would require the use of high power stations. The one common characteristic of these stations is that they are each equipped for undamped wave transmission. Accordingly, the use of spark signals at the reference station is at once ruled out. It would be a very simple expedient to send out the undamped waves, characteristic of the radiation from these stations, modulated by a signal containing many frequencies, as by a modulating source the frequency of which is continuously and cyclically varied by mechanical means. The modulations, separated out in the output of a detecting tube, would be similar in all characteristics affecting accurate direction finding to the highly damped wave which has heretofore been used. It is accordingly the essence of the invention to simulate the conditions obtaining in the damped wave signal by means of modulations of an undamped wave, the said modulations being caused to have a continuously varying frequency.

Figure 2:
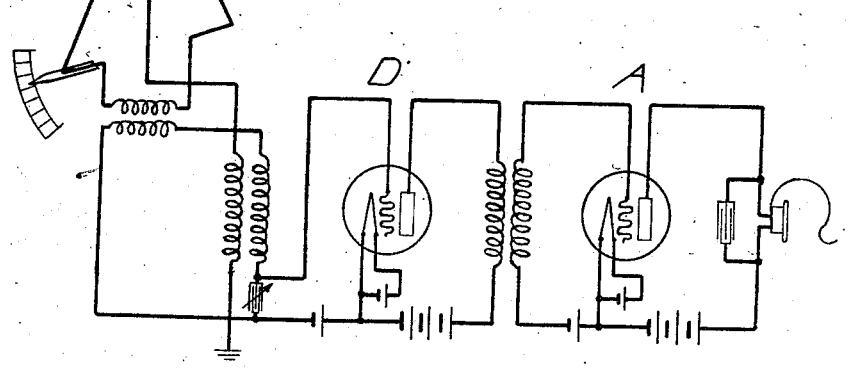

For a description of the invention in a specific embodiment, reference is made to the following description taken in connection with the appended drawings, wherein is disclosed, in Fig. 1, a circuit diagram of a transmitting station which embodies the idea of the invention. Fig. 2 shows the circuits a receiving station which may be used with the transmitting station illustrated in Fig. 1.

Referring to Fig. 1, the figure, as a whole, is illustrative of a simple circuit arrangement by means of which it is possible to transmit modulated carrier frequency signals. The various elements which go to make up the system are each old and require little explanation. The reference ordinal G indicates a conventional circuit arrangement of an oscillator, the particular oscillator chosen being of the well known Hartley type. This oscillator is a source of the carrier frequency oscillations, the frequency of which may be varied by adjustment of the constants of the oscillatory circuit associated therewith in a well known manner. The carrier waves are modulated by the low-frequency wave emanating from the low-frequency source $G_1$, by means of the modulator M, on the input circuit of which the carrier wave and the modulating wave are impressed in common. The output circuit of the modulator accordingly has an alternating current component of the carrier frequency varying in amplitude with the low-frequency electromotive force of source $G_1$. The amplifiers A, A, are connected in parallel to provide sufficient current capacity for the relatively high power that may be required in the usual case. The transmitting system is capable of indefinite extension by the addition of other amplifiers in parallel with those shown and by the addition of groups similar to that shown, in series. In this manner, the capacity may be sufficiently increased to provide even for transoceanic transmission.

For the modulating means a low-frequency generator $G_1$ is here shown as replacing the usual microphone means. The frequency of oscillation of this oscillator is continuously and cyclically varied by a mechanical actuating means operatively connected to the movable element of the condenser, which constitutes with the coupling inductance, the oscillation circuit of the generator. Other means for modulating the carrier wave with a signal of many frequencies may be employed, that shown being perhaps as simple and obvious a means as any to accomplish this purpose. It is obvious that a voice modulated carrier wave would be equally as effective, although possibly not as adaptable for practical purposes.

Fig. 2 shows the receiving circuit which is related to the transmitting circuit described above. Any directive receiving system whatever is adaptable to the purpose of the invention, that shown being illustrative of a common type.

The detector D and the amplifier A, in the output circuit of which is connected the indicating instrument, require no explanation except the statement that they here function as they do in any receiving circuit of which they may form a part. The particular directive means shown is one of the several forms embodying the well known Bellini-Tosi principle. In the arrangement illustrated, two antennae are mutually related to the input circuit of the detector. The antenna 1 has no directive characteristics and its presence in the circuit results in a continuous sound in the receiver. The antenna 2 is capable of being rotated about the vertical axis, as shown, and has an electromotive force generated therein by impinging radio waves, the amplitude of the electromotive force depending on the presentation of the antenna to the direction of the incident waves at the particular moment. In general, the effect is a maximum when the plane of the antennae is parallel to the direction of the incident waves, and is a minimum, or zero, when its plane is normal to this direction. The antenna 2 is accordingly rotated until the position of maximum or minimum strength of signals is found, the null position of the antenna being usually more effective in making the settings. The system would function efficiently if the antenna 2 were alone used, but the presence of strays and static would tend to broaden the directivity curve close to its minimum point and it has been found to be better to operate around a minimum which corresponds roughly to a normal intensity of received signals. To this end, the antenna 1 is used. The presence of a signal in the receiver having a constant intensity, due to this antenna, tends to drown out the undesirable static and strays, as well as to increase the sensitivity of adjustment of the apparatus. An additional function of the vertical antenna 1 is to confine the field of directive influence to but a single direction in the plane of the antenna 2. The polar diagram which indicates by its radius sector the selectivity of the system comprising antenna 2 is a figure of eight curve which may be represented by two tangent circles. The superposition of a circle representing the radiation diagram of the vertical antenna and the vector addition thereof in regard to direction results in a heart-shaped curve which indiates the directivity in a single direction. Reference is made to pages 633 to 635 of Fleming, "The Principles of Electric Wave Telegraphy and Telephony" third edition, for further disclosure of the operation of this type of apparatus. There is shown an indicating means associated with the movable portion of the antenna by means of which the direction of incident waves may be determined. If it is desired to receive signals from certain predetermined reference stations, the receiving circuit may be broadly tuned to the corresponding transmission stations, so that either of or any one of the reference stations may be picked up by sweeping the antenna over a sufficiently angular range. After picking up the desired station, the circuit may be tuned to the particular frequency. In practical operation, accordingly, an attendant at the reciving station desiring to know his position would obtain a bearing in turn on each of two or more reference stations after which he would determine the position by mathematical calculation. If he desired to obtain his bearing only with respect to a certain reference station, it would be sufficient to obtain a reading on that station only. In either case the reference stations may, by predetermined arrangement, send out the signal modulations at a certain and known time and each station may easily be distinguished from the other stations by a particular modulating characteristic.

Although in Fig. 1 there is shown a method of modulating an undamped wave, it should be understood that this is illustrative only of one possible means for modifying the character of undamped waves and that the invention contemplates broadly the simulation of spark transmission involving the use of undamped waves, by any means whatever.

What is claimed is:

1. The method of direction finding which comprises generating a continuous wave, modulating said wave in accordance with a wave having a cyclically and continuously varying frequency to thereby simulate a damped wave and therefore to insure its rectilinear propagation, rectilinearly transmitting said modulated waves in all directions, and directively receiving said modulated wave.

2. The method of determining the direction of a mobile receiving station with reference to a fixed transmitting station, which consists in generating an undamped wave at the fixed station, at least partially modulating said wave in accordance with a wave having a cyclically and continuously varying frequency to thereby simulate an undamped wave and therefore to insure rectilinear propagation, rectilinearly transmitting in all directions said wave, including the modulated portion, receiving said wave, including the modulated portion, at the mobile station, and determining its direction of incidence.

In witness whereof, I hereunto subscribe my name this 8th day of September A. D., 1920.

LEWIS M. CLEMENT.